(12) United States Patent
Kim et al.

(10) Patent No.: US 12,184,849 B2
(45) Date of Patent: Dec. 31, 2024

(54) DEVICE AND METHOD FOR PERFORMING FAST GRID-BASED REFINING SEGMENTATION FOR V-PCC ENCODING

(71) Applicant: KOREA ELECTRONICS TECHNOLOGY INSTITUTE, Seongnam-si (KR)

(72) Inventors: Yong Hwan Kim, Anyang-si (KR); Yura Kim, Hwaseong-si (KR); Jong-geun Park, Seoul (KR); Hyun Ho Kim, Seongnam-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 213 days.

(21) Appl. No.: 18/058,634

(22) Filed: Nov. 23, 2022

(65) Prior Publication Data

US 2024/0098263 A1    Mar. 21, 2024

(30) Foreign Application Priority Data

Sep. 15, 2022  (KR) .................. 10-2022-0116018

(51) Int. Cl.
*H04N 7/12* (2006.01)
*H04N 19/119* (2014.01)
*H04N 19/136* (2014.01)
*H04N 19/167* (2014.01)
*H04N 19/423* (2014.01)
*H04N 19/85* (2014.01)

(52) U.S. Cl.
CPC ......... *H04N 19/119* (2014.11); *H04N 19/136* (2014.11); *H04N 19/167* (2014.11); *H04N 19/423* (2014.11); *H04N 19/85* (2014.11)

(58) Field of Classification Search
CPC ........................... H04N 19/423; H04N 19/119
See application file for complete search history.

(56) References Cited

U.S. PATENT DOCUMENTS

2002/0012472 A1* 1/2002 Waterfall ............. H04N 19/503
382/245

* cited by examiner

*Primary Examiner* — Young Lee
(74) *Attorney, Agent, or Firm* — Knobbe, Martens, Olson & Bear, LLP

(57) ABSTRACT

A device and method for performing fast grid-based refining segmentation (FGRS) for video-based point cloud compression (V-PCC) is proposed. The method may include dividing a space of a three-dimensional (3D) point cloud into multiple grids to derive multiple voxels, searching for filled voxels including one or more points, searching for surrounding voxels which are filled voxels within a certain radius from each of the filled voxels, and searching for edge voxels which are present at a segment edge among all the filled voxels. The method may also include calculating smooth scores for surrounding voxels of each edge voxel and calculating a smooth score sum which is a smooth score for the edge voxel on the basis of the smooth scores of the surrounding voxels of the edge voxel, and updating a projection plane index (PPI) for each individual point in the edge voxel using the calculated smooth score sum.

14 Claims, 9 Drawing Sheets

| $D^2$(dist2) | Relative coordinates of search candidates (cand_coord) |
|---|---|
| 1 | (1,0,0) (0,1,0) (0,0,1) (-1,0,0) (0,-1,0) (0,0,-1) |
| 2 | (0,1,1) (1,0,1) (1,1,0) (0,-1,1) (-1,0,1) (-1,1,0) <br> (0,1,-1) (1,0,-1) (1,-1,0) (0,-1,-1) (-1,0,-1) (-1,-1,0) |
| 3 | (1,1,1) (-1,-1,-1) (1,1,-1) (-1,-1,1) <br> (-1,1,-1) (1,-1,1) (-1,1,1) (1,-1,-1) |
| 4 | (2,0,0) (0,2,0) (0,0,2) (-2,0,0) (0,-2,0) (0,0,-2) |
| 5 | (0,1,2) (1,0,2) (1,2,0) (0,-1,2) (-1,0,2) (-1,2,0) <br> (0,2,1) (2,0,1) (2,1,0) (0,-2,1) (-2,0,1) (-2,1,0) <br> (0,2,-1) (2,0,-1) (2,-1,0) (0,-2,-1) (-2,0,-1) (-2,-1,0) <br> (0,1,-2) (1,0,-2) (1,-2,0) (0,-1,-2) (-1,0,-2) (-1,-2,0) |
| 6 | (1,1,2) (-2,-1,-1) (1,2,-1) (-1,-1,2) (-1,2,-1) (1,-1,2) <br> (-1,1,2) (2,-1,-1) (1,2,1) (-1,-2,-1) (2,1,-1) (-2,-1,1) <br> (-2,1,-1) (2,-1,1) (-1,2,1) (1,-2,-1) (2,1,1) (-1,-1,-2) <br> (1,1,-2) (-1,-2,1) (-1,1,-2) (1,-2,1) (-2,1,1) (1,-1,-2) |
| 8 | (0,2,2) (2,0,2) (2,2,0) (0,-2,2) (-2,0,2) (-2,2,0) <br> (0,2,-2) (2,0,-2) (2,-2,0) (0,-2,-2) (-2,0,-2) (-2,-2,0) |
| 9 | (3,0,0) (0,3,0) (0,0,3) (-3,0,0) (0,-3,0) (0,0,-3) <br> (1,2,2) (-2,-2,-1) (2,2,-1) (-2,-1,2) (-2,2,-1) (2,-1,2) <br> (-1,2,2) (2,-2,-1) (2,1,2) (-2,-1,-2) (1,2,-2) (-1,-2,2) <br> (-1,2,-2) (1,-2,2) (-2,1,2) (2,-1,-2) (2,2,1) (-1,-2,-2) <br> (2,1,-2) (-2,-2,1) (-2,1,-2) (2,-2,1) (-2,2,1) (1,-2,-2) |
| ... | ... |

FIG. 9

```
vector<bit> occFlagArray[grid_dim³] = {0}   // bit-wise flag
unordered_map<pos_ID, filled_v_idx> voxelIdxMap
vector<voxel> filledVoxels
filled_v_count = 0   // filled voxel count
FOR point_idx = 0 to point_cloud.size
  vx = x/vox_dim, vy = y/vox_dim, vz = z/vox_dim
  pos_ID = vx + vy*grid_dim + vz*grid_dim²
  IF occFlagArray[pos_ID] == 0
    occFlagArray [pos_ID] = 1
    voxelIdxMap.push(pos_ID, filled_v_count)
    filledVoxels[filled_v_count].add_pos(pos_ID)
    filledVoxels[filled_v_count++].add_point(point_idx)
  ELSE
    filled_v_idx = voxelIdxMap.search(pos_ID)
    filledVoxels[filled_v_idx].add_point(point_idx)
  END IF
END FOR
// generate ADJ_List & IDEV_List by proposed search method
FOR v_idx = 0 to filled_v_count
  cur_pos_ID = filledVoxels[v_idx].get_pos()
  find valid 3D search range centered on cur_pos_ID
  num_nn_points = 0 // the number of points within neighboring
voxels
    FOR search_idx = 0 to SSCA.size   // SSCA table look-up
      IF SSCA[search_idx].cand_coord exceeds valid 3D search range
        Continue
      ENF IF
      cand_pos_ID = cur_pos_ID + SSCA[search_idx].cand_coord
      IF occFlagArray[cand_pos_ID] == 1
        neighbor_v_idx = voxelIdxMap.search(cand_pos_ID)
        ADJ_List[v_idx].push(neighbor_v_idx)
        IF SSCA[search_idx].dist2 <= IDEV_range // e.g., 3 or 8
          IDEV_List[v_idx].push(neighbor_v_idx)
        END IF
        num_nn_points += filledVoxels[neighbor_v_idx].point_count
        IF num_nn_points >= maxNNCount // e.g., 1024
          Break
        END IF
      END IF
    END FOR
END FOR
```

FIG. 10

DEVICE AND METHOD FOR PERFORMING FAST GRID-BASED REFINING SEGMENTATION FOR V-PCC ENCODING

CROSS-REFERENCE TO RELATED APPLICATION

This application claims priority to and the benefit of Korean Patent Application No. 10-2022-0116018, filed on Sep. 15, 2022, the disclosure of which is incorporated herein by reference in its entirety.

BACKGROUND

Technical Field

The present disclosure relates to a video-based point cloud compression (V-PCC) encoding technology, and more particularly, to a technology for precisely and highly efficiently performing segmentation refinement for V-PCC encoding.

Discussion of Related Technology

A point cloud (also referred to as a "three-dimensional (3D) point cloud") is a set of points in a 3D space. Such a point cloud is intermediate data that is used for converting 3D video data acquired through a 3D scanner or the like into another model.

Lately, with an increase in the operating speed of processors, such as multicore processors, graphics processing units (GPUs), etc., attempts have been made to express 3D video data using point clouds. For example, point clouds can be applied to 3D video data such as augmented reality (AR), virtual reality (VR), 3D holograms, etc.

SUMMARY

The present disclosure is directed to providing a technology for precisely and highly efficiently performing fast grid-based refining segmentation (FGRS) which heavily influences a compression rate and picture quality for video-based point cloud compression (V-PCC) encoding.

The present disclosure is also directed to providing a technology for improving performance, such as a compression rate, picture quality, etc., of V-PCC encoding.

The present disclosure is also directed to providing a technology for performing FGRS with low complexity at a high speed by performing a surrounding voxel search process, which is necessarily performed in FGRS for V-PCC encoding, on the basis of a lookup table in which a wide range of surrounding voxel information is used rather than on the basis of a k-dimensional (k-d) tree radius search.

The present disclosure is also directed to providing a technology for increasing an encoding rate in V-PCC encoding.

However, objectives to be solved by the present disclosure are not limited to those described above, and other objectives which have not been described will be clearly understood by those of ordinary skill in the art from the following description.

According to an aspect of the present disclosure, there is provided a method of performing FGRS for V-PCC in an electronic device, the method including dividing a space of a three-dimensional (3D) point cloud into multiple grids to derive multiple voxels, searching for filled voxels which are voxels including one or more points, searching for surrounding voxels which are filled voxels within a certain radius from each of the filled voxels, searching for edge voxels which are present at a segment edge among all the filled voxels, calculating smooth scores for surrounding voxels of each edge voxel and calculating a smooth score sum which is a smooth score for the edge voxel on the basis of the smooth scores of the surrounding voxels of the edge voxel, and updating a projection plane index (PPI) for each individual point in the edge voxel using the calculated smooth score sum.

The calculating of the smooth score sum may include giving weights to distances between the edge voxel and the surrounding voxels to calculate the smooth score sum.

The calculating of the smooth score sum may include reflecting the weights inversely proportional to the distances while adding the smooth scores of the surrounding voxels of the edge voxel.

The calculating of the smooth score sum may include reflecting the weights so that the smooth score sum of the edge voxel is more affected by a smooth score value of a surrounding voxel which is closer to the edge voxel.

The calculating of the smooth score sum may include calculating the smooth score sum of the edge voxel which is proportional to a first sum of values obtained by dividing the smooth scores of the surrounding voxels of the edge voxel by a distance item including a corresponding distance.

The calculating of the smooth score sum may include calculating the smooth score sum of the edge voxel which is inversely proportional to a second sum of reciprocals of the distance item for the surrounding voxels of the edge voxel.

The distance item may include a constant added to the distances.

The updating of the PPI may include calculating a final score for the edge voxel on the basis of the smooth score sum and updating the PPI in accordance with the final score, and the final score may be proportional to a value obtained by normalizing the smooth score sum (scoreSmoothSum[v][p]).

According to another aspect of the present disclosure, there is provided a device including a memory configured to store point clouds and a controller configured to control FGRS for V-PCC encoding using information stored in the memory.

The controller may perform operations of dividing a space of a 3D point cloud into multiple grids to derive multiple voxels, searching for filled voxels which are voxels including one or more points, searching for surrounding voxels which are filled voxels including one or more points within a certain radius from each of the filled voxels, searching for edge voxels which are present at a segment edge among all the filled voxels, calculating smooth scores for surrounding voxels of each edge voxel and calculating a smooth score sum which is a smooth score for the edge voxel on the basis of the smooth scores of the surrounding voxels of the edge voxel, and updating a PPI for each individual point in the edge voxel using the calculated smooth score sum. When the controller calculates the smooth score sum, the controller may give weights to distances between the edge voxel and the surrounding voxels to calculate the smooth score sum.

The controller may reflect the weights inversely proportional to the distances while adding the smooth scores of the surrounding voxels of the edge voxel.

The smooth score sum of the edge voxel may be more affected by a smooth score value of a surrounding voxel which is closer to the edge voxel.

The smooth score sum of the edge voxel may be proportional to a first sum of values obtained by dividing the smooth scores of the surrounding voxels of the edge voxel by a distance item including a corresponding distance.

The smooth score sum of the edge voxel may be inversely proportional to a second sum of reciprocals of the distance item for the surrounding voxels of the edge voxel.

The distance item may include a constant added to the distances.

During the updating of the PPI, the controller may calculate a final score for the edge voxel on the basis of the smooth score sum and update the PPI in accordance with the final score, and the final score may be proportional to a value obtained by normalizing the smooth score sum (scoreSmoothSum[v][p]).

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings.

FIG. 9 is an example of a lookup table generated according to a first exemplary embodiment; and FIG. 10 is an example of pseudocode for generating a bit array and searching for surrounding voxels using a lookup table.

DETAILED DESCRIPTION

Figure 1:
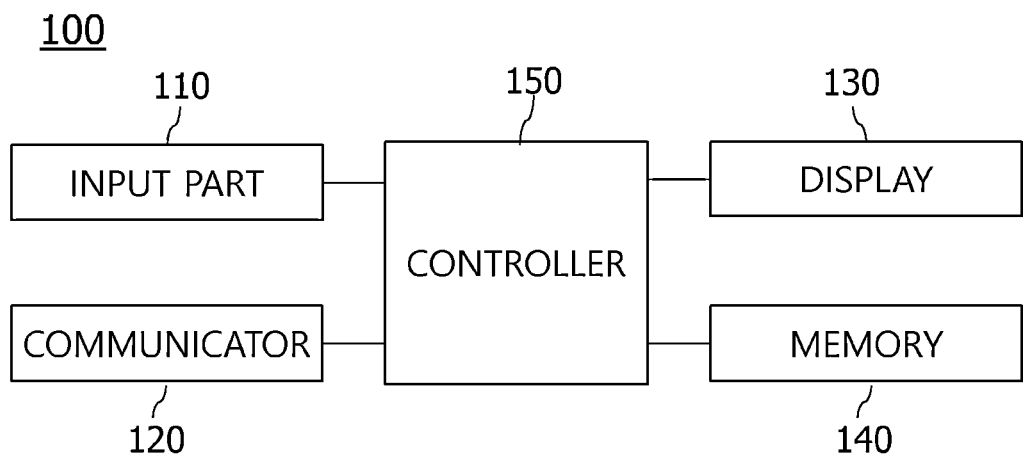
FIG. 1 is a block diagram of an electronic device according to an exemplary embodiment of the present disclosure.

A point cloud is generally a large amount of data, and thus it is necessary to compress 3D video data in order to transmit the corresponding large amount of data through a limited bandwidth. Accordingly, in International Organization for Standardization/International Electrotechnical Commission (ISO/IEC) Moving Picture Expert Group (MPEG), encoding technologies for compressing a 3D point cloud on the basis of a two-dimensional (2D) video have been standardized (ISO/IEC MPEG-I Part 5: Visual Volumetric Video-based Coding (V3C) and Video-based Point Cloud Compression (V-PCC)).

According to V-PCC, one of the standardized technologies, 3D video data is divided into 2D patches, reconstructed into a 2D image, and then encoded using a standard 2D video codec such as high efficiency video coding (HEVC) or the like. To divide 3D video data into 2D patches (patch segmentation) according to V-PCC, normal vector estimation, initial segmentation, segmentation refinement, etc. are sequentially performed.

With regard to segmentation refinement, various voxel types are defined in accordance with projection plane index (PPI) characteristics of points included in grids, and no-edge voxels (NE-Vs) that do not require a segmentation refinement operation are not subjected to a segmentation refinement operation. Accordingly, fast grid-based refining segmentation (FGRS) can be generally performed.

According to existing FGRS, in the case of calculating a score of a current edge voxel, a weight is calculated on the basis of the PPI distribution of voxels surrounding the edge voxel to update PPIs of points in the edge voxel. In this case, a simple method of equally adding the number of PPIs regardless of the distances from the current voxel to the surrounding voxels is used. However, a PPI based on a normal vector of a point naturally has a closer relationship with an adjacent voxel than a distant voxel. Accordingly, according to existing FGRS, there is a high probability of over-smoothing due to an incorrect PPI update affected by a voxel distant from an initial segment boundary. As a result, the precision of segmentation refinement is degraded, and compressed picture quality is highly likely to be lowered.

Also, according to the existing FGRS, in the case of calculating a score of a current edge voxel, a weight is calculated on the basis of the PPI distribution of voxels surrounding the edge voxel to update PPIs of points in the edge voxel. To this end, a process of searching for voxels surrounding a current voxel (hereinafter, a "surrounding voxel search process") is performed on the basis of a k-dimensional (k-d) tree radius search algorithm. Accordingly, the surrounding voxel search process has the following problems: 1) it takes considerable time to create a tree data structure, and 2) the amount of computation and memory access for finding surrounding voxels on the basis of the generated data structure drastically increase with an increase in the number of target voxels. In other words, the surrounding voxel search process based on k-d tree radius search occupies more than 70% of the total computation amount of FGRS. Due to the large computation amount of the surrounding voxel search process based on k-d tree radius search, the total computation amount of a V-PCC encoding process increases, and the processing speed becomes very slow.

The above objectives and means of the present disclosure and effects thereof will become apparent through the following detailed description related to the accompanying drawings, and accordingly, those of ordinary skill in the art may easily implement the technical spirit of the present disclosure. In describing the present disclosure, when it is deemed that detailed description of known technology related to the present disclosure may unnecessarily obscure the gist of the present disclosure, the detailed description will be omitted.

Terminology used in this specification is for the purpose of describing exemplary embodiments and is not intended to limit the present disclosure. As used herein, a singular expression may include a plural expression in some cases unless the context clearly indicates to the contrary. As used herein, the expressions "include," "comprise," "have," etc. do not exclude the existence or addition of one or more components other than stated components.

As used herein, the terms "or," "at least one," etc. may denote one of the elements that are listed together or a combination of two or more of the elements. For example, "A or B," and "at least one of A and B" may include only one of A and B or both A and B.

In this specification, description following "for example" and the like may not exactly match the information presented, such as the recited characteristics, variables, or values, and the exemplary embodiments of the present disclosure should not be limited to effects such as variations including tolerances, measurement errors, limitations of measurement accuracy, and other commonly known factors.

In this specification, when a component is described as being "connected" or "coupled" to another component, it may be directly connected or coupled to the other component, but it should be understood that another component may be present therebetween. On the other hand, when a component is referred to as being "directly connected" or "directly coupled" to another component, it should be understood that there is no other component therebetween.

In this specification, when a component is described as being "on" or "adjacent to" another component, it may be directly in contact with or connected to the other component, but it should be understood that another component may be present therebetween. On the other hand, when a component is described as being "directly on" or "directly adjacent to" another component, it may be understood that there is no other component therebetween. Other expressions describing the relationship between components, for example, "between," "directly between," etc., may be interpreted in the same way.

In this specification, terms such as "first," "second," etc. may be used to describe various components, but the corresponding components should not be limited by the terms. Also, the terms should not be interpreted as limiting the order of components and may be used for the purpose of distinguishing one component from another component. For example, a "first component" may be named a "second component," and similarly, a "second component" may be named a "first component."

Unless otherwise defined, all terms used herein may be used with meanings that can be commonly understood by those of ordinary skill in the art. Also, terms defined in a commonly used dictionary are not interpreted ideally or excessively unless clearly so defined Hereinafter, exemplary embodiments of the present disclosure will be described in detail with reference to the accompanying drawings.

FIG. 1 is a block diagram of an electronic device 100 according to an exemplary embodiment of the present disclosure.

The electronic device 100 according to the exemplary embodiment of the present disclosure is a device that processes encoding for compressing a three-dimensional (3D) point cloud (hereinafter, a "point cloud") which is a set of points representing 3D video data of a 3D object in a 3D space.

For example, the electronic device 100 may be, but is not limited to, a device for encoding a prestored point cloud or providing a 3D video on demand (VOD) service, a real-time 3D video streaming service, etc. which encodes and transmits a corresponding point cloud.

In particular, the electronic device 100 is a device for performing encoding in accordance with video-based point cloud compression (V-PCC) and may precisely and highly efficiently perform fast grid-based refining segmentation (FGRS). Also, the electronic device 100 may perform FGRS with low complexity at a high speed.

Such FGRS is a segmentation refinement process that is necessarily performed for V-PCC encoding and may heavily influence a compression rate and picture quality in V-PCC. Accordingly, the electronic device 100 can improve performance, such as a compression rate, picture quality, etc., of V-PCC encoding. This will be described in further detail in an encoding method to be described below.

The electronic device 100 may be a terminal capable of computing. For example, the electronic device 100 may be, but is not limited to, a general-use computing system, such as a desktop personal computer (PC), a laptop PC, a tablet PC, a netbook computer, a workstation, a personal digital assistant (PDA), a smartphone, a smart pad, a mobile phone, etc., or a dedicated embedded system implemented on the basis of embedded Linux or the like.

As shown in FIG. 1, the electronic device 100 may include an input part 110, a communicator 120, a display 130, a memory 140, and a controller 150. For encoding a point cloud, the memory 140 and the controller 150 may be necessary elements, and the input part 110, the communicator 120, and the display 130 may be additional elements.

The input part 110 generates input data in accordance with various inputs of a user and may include various input devices. For example, the input part 110 may include, but is not limited to, a keyboard, a keypad, a dome switch, a touch panel, a touch key, a touchpad, a mouse, a menu button, etc.

The communicator 120 is an element for communication with other devices such as a server and the like. The communicator 120 may transmit encoded data of a point cloud to another device. For example, the communicator 120 may perform wireless communication, such as fifth generation (5G) communication, Long Term Evolution Advanced (LTE-A), LTE, Bluetooth, Bluetooth low energy (BLE), near field communication (NFC), WiFi communication, etc., and wired communication, such as cable communication and the like, but communication performed by the communicator 120 is not limited thereto.

The display 130 displays various pieces of video data on a screen and may be a non-luminescent panel or a luminescent panel. For example, the display 130 may be, but is not limited to, a liquid crystal display (LCD), a light-emitting diode (LED) display, an organic LED (OLED) display, a micro-electro mechanical system (MEMS) display, an electronic paper, etc. Also, the display 130 may be implemented as a touchscreen or the like in combination with the input part 110.

The memory 140 stores various pieces of information necessary for operations of the electronic device 100. Information stored in the memory 140 may include, but is not limited to, point clouds, program information related to an encoding method to be described below, etc.

For example, the memory 140 may be, but is not limited to, a hard disk type, a magnetic media type, a compact disc read only memory (CD-ROM), an optical media type, a magneto-optical media type, a multimedia card micro type, a flash memory type, a ROM type, a random access memory (RAM) type, etc. Also, the memory 140 may be, but is not limited to, a cache, a buffer, a main memory, an auxiliary memory, or a separately provided storage system according to its purpose/location.

The controller 150 may perform various control operations of the electronic device 100. In other words, the controller 150 may control performing of the encoding method to be described below and control operations of other elements of the electronic device 100, that is, the input part 110, the communicator 120, the display 130, the memory 140, etc.

For example, the controller 150 may be, but is not limited to, a hardware processor, a software process performed by a corresponding processor, etc. As an example, the processor may be, but is not limited to, a microprocessor, a central processing unit (CPU), a processor core, a multiprocessor, an application-specific integrated circuit (ASIC), a field programmable gate array (FPGA), etc.

Figure 2:
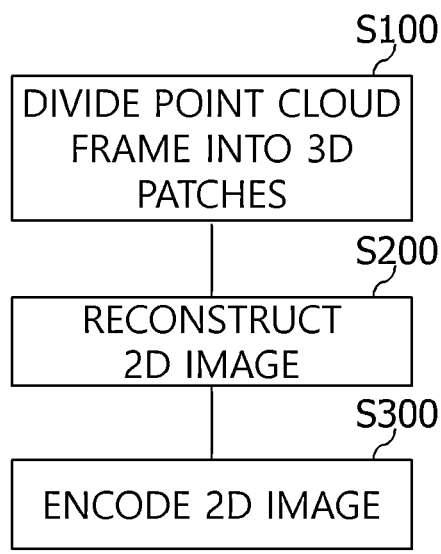
FIG. 2 is a flowchart illustrating an encoding method according to an exemplary embodiment of the present disclosure.

FIG. 2 is a flowchart illustrating an encoding method according to an exemplary embodiment of the present disclosure.

The encoding method according to an exemplary embodiment of the present disclosure (hereinafter, the "present method") is a method in which the electronic device 100 performs encoding in accordance with V-PCC to compress a point cloud. As shown in FIG. 2, the present method includes operations S100 to S300. Performing operations S100 to S300 may be controlled by the processor or the process of the controller 150.

Operation S100 is a process of dividing each point cloud frame of 3D video data into 3D patches. In other words, a virtual bounding box is set for a 3D object, and then it is determined which projection planes are appropriate using normal vectors of points constituting the object. When projection planes are determined for all the points, points having the same projection plane are grouped as connected components and defined as a 3D patch.

Operation S200 is a process of orthographically projecting segmented 3D patches into two-dimensional (2D) patches to reconstruct a 2D image.

Operation S300 is a process of encoding the reconstructed 2D image using a 2D video codec. For example, in operation S300, a standard video codec, such as high efficiency video coding (HEVC), AOMedia Video 1 (AV1), versatile video coding (VVC), etc., may be used.

Figure 3:
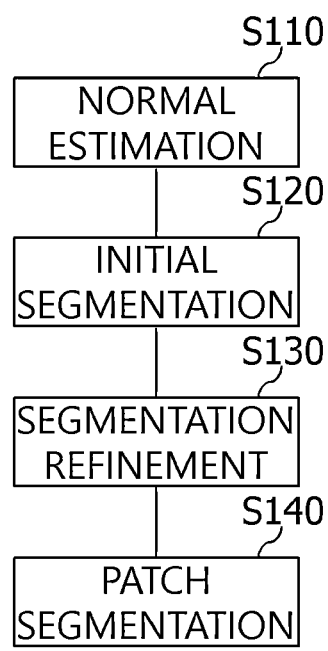
FIG. 3 is a flowchart illustrating a detailed process of operation according to the exemplary embodiment of the present disclosure.

FIG. 3 is a flowchart illustrating a detailed process of operation S100 according to the exemplary embodiment of the present disclosure, and FIGS. 4A-4D show an example of the detailed process of operation S100.

Meanwhile, as shown in FIG. 3, operation S100 may include a detailed process of operations S110 to S140 for 3D patch segmentation.

First, operation S110 is a process of normal estimation. In other words, referring to FIG. 4A, a normal vector for each 3D point (each individual point) of a point cloud is estimated using surrounding points.

Operation S120 is a process of initial segmentation. In other words, referring to FIG. 4B, a projection plane index (PPI) of one of multiple directions is assigned to a corresponding individual point on the basis of a normal vector of the individual point estimated in operation S110. For example, the inner products of a normal vector of an individual point and normal vectors of object projection planes (basically 6 directions, and 18 directions at most) is calculated, and a PPI having the largest value (i.e., which is almost parallel to the corresponding projection plane) may be assigned. Surrounding points belonging to the same projection plane are grouped as an initial segment (i.e., cluster). As a result, each individual point has an individual PPI, and all points in one segment have the same PPI. As an example, PPIs corresponding to the minimum of 6 directions to the maximum of 18 directions may be assigned to a corresponding individual point.

Figure 4:
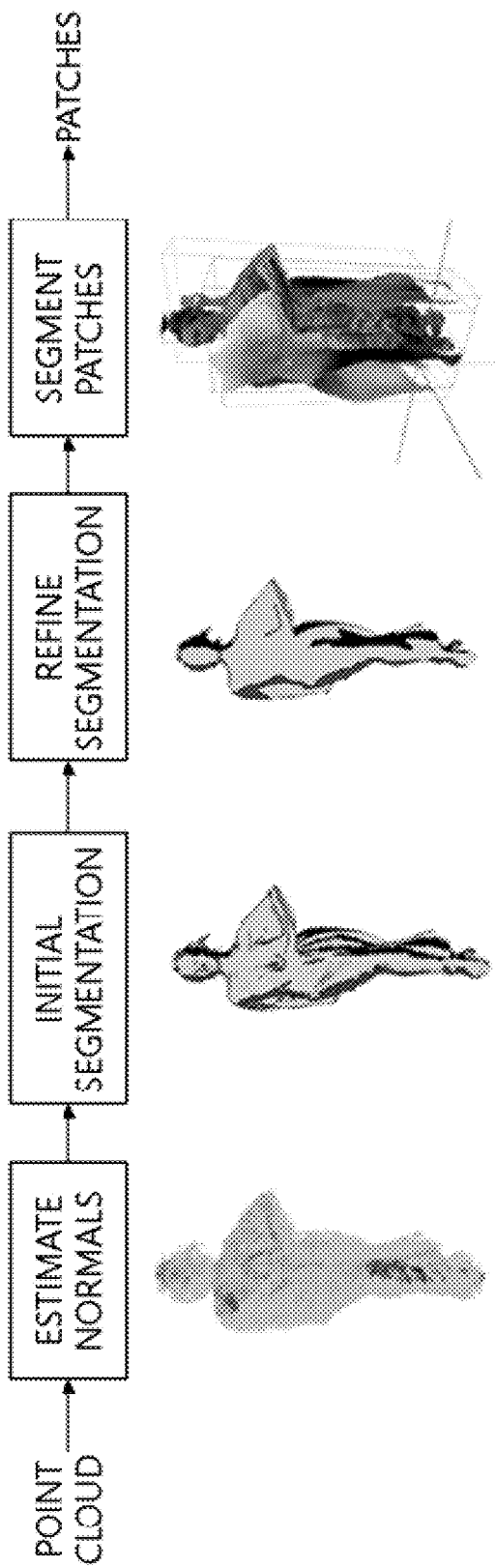
FIGS. 4A-4D show an example of the detailed process of operation.

For reference, in FIGS. 4B and 4C, each group expressed in the same color corresponds to an initial segment (cluster).

Operation S130 is a process of segmentation refinement. In other words, referring to FIG. 4C, a smoothing process is performed on a PPI of each individual point (current point) using PPIs of surrounding points. As a result, the PPI of the current point may be changed to reflect at least some of the PPIs of the surrounding points, thereby being refined.

Due to this operation S130, points distinguished in FIG. 4B may be remarkably reduced in FIG. 4C.

Operation S130 is necessary for the following two reasons.

First, since it is not possible to calculate an accurate normal vector in operation S110, initial segments (clusters) have many distinguished points as shown in FIG. 4B. For this reason, there are a large number of segments, and many patches are generated, which leads to a degradation in the compression efficiency. Second, even when initial normal vectors are accurate, the compression efficiency is naturally degraded with an increase in the number of segments. Accordingly, the segmentation refinement process of operation S130 is provided so that patches are effectively generated.

Operation S140 is a process of patch segmentation. In other words, referring to FIG. 4D, the point cloud which has undergone segmentation refinement is divided into a minimum number of 3D patches having smooth boundaries.

Technology Related to Operation S130

Meanwhile, in operation S130, a smoothing operation is performed by giving weights to a normal vector value of a certain point and the PPI distribution of surrounding points. Through this operation, smoothed patches may be generated as shown in FIG. 4C.

In connection with operation S130, a grid-based refine segmentation (GRS) method of performing a segmentation refinement operation by classifying all points into 2×2×2 or 8×8×8 grid units (hereinafter, a "first refinement technology") has been proposed.

In other words, according to the first refinement technology, a point cloud space is divided into 3D grids, 3D voxels including one or more points are found, and PPIs of points in a current one of the 3D voxels are refined using 3D voxels surrounding the current 3D voxel. According to the related technology, smooth scores scoreSmooth of surrounding points (i.e., the sum of the numbers of PPIs that surrounding points have) are calculated per point for a segmentation refinement operation. On the other hand, according to the first refinement technology, smooth scores of surrounding voxels are calculated for one voxel at a time and repeatedly used so that the amount of computation can be reduced.

Figure 5:
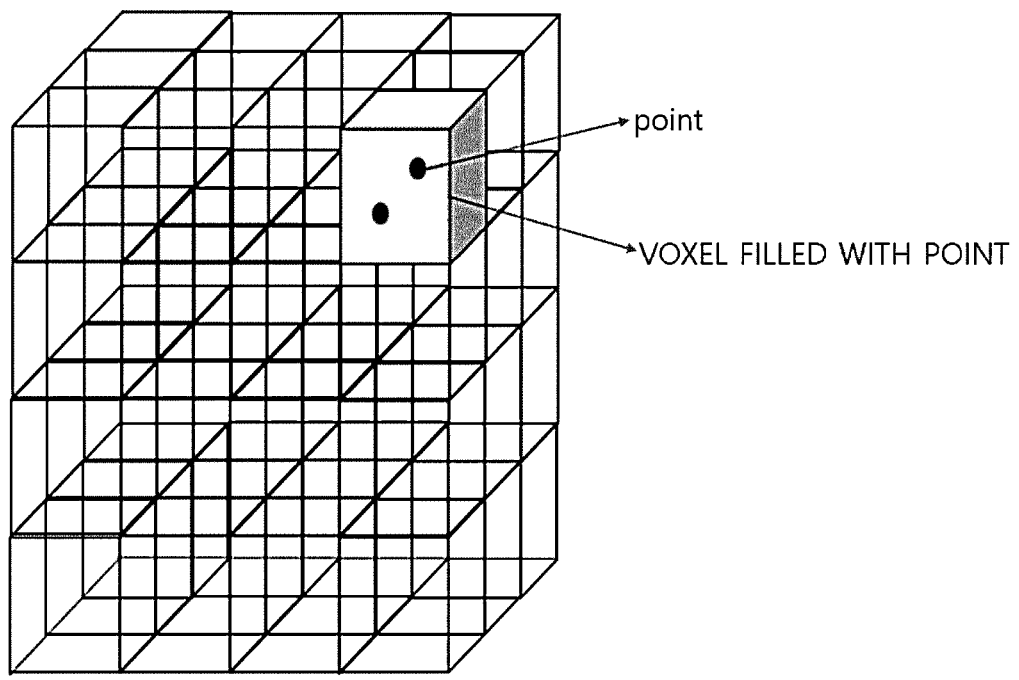
FIG. 5 shows an example of three-dimensional (3D) grid-based spatial division of a 3D point cloud.

FIG. 5 shows an example of 3D grid-based spatial division of a 3D point cloud.

In connection with operation S130, an FGRS method (hereinafter, a "second refinement technology") also has been proposed. The second refinement technology will be described below.

First, a point cloud space is divided into 3D grids, and then voxels which are cubic areas and include one or more points are defined as filled voxels. Subsequently, a "surrounding voxel search process" is performed to search for all surrounding filled voxels (nnFilledVoxels) close to each of the filled voxels, and voxels including at least a part of a segment boundary are classified as edge voxels among all the filled voxels. PPIs of points in each edge voxel are updated (i.e., refined) on the basis of an "appropriate weight."

This process is not performed only once but is repeated for the entire space so that PPIs of points are updated several times. For example, the process is repeated at least 10 times, and voxel dimensions used in grid division have a minimum width×length×depth size of 2×2×2. Optionally, a size of 4×4×4 or 8×8×8 may be used.

According to the second refinement technology, in the case of calculating a score of a current voxel to update PPIs of points in the voxel, a weight is calculated on the basis of PPI distribution of surrounding voxels. In this case, the numbers of PPIs in the surrounding voxels are simply added regardless of the distances between the current voxel and the surrounding voxels. However, a PPI based on a normal vector of a point naturally has a closer relationship with an adjacent voxel than a distant voxel. Accordingly, according to the second refinement technology, there is a high probability of over-smoothing due to an incorrect PPI update affected by a voxel distant from an initial segment boundary or the like. As a result, the precision of segmentation refinement is degraded, and compressed picture quality is highly likely to be lowered.

Therefore, the present encoding method implements a third refinement technology obtained by solving the problem of the second refinement technology described in the segmentation refinement process of operation S130 in the detailed process of operation S100. The third refinement technology will be described in detail below.

Figure 6:
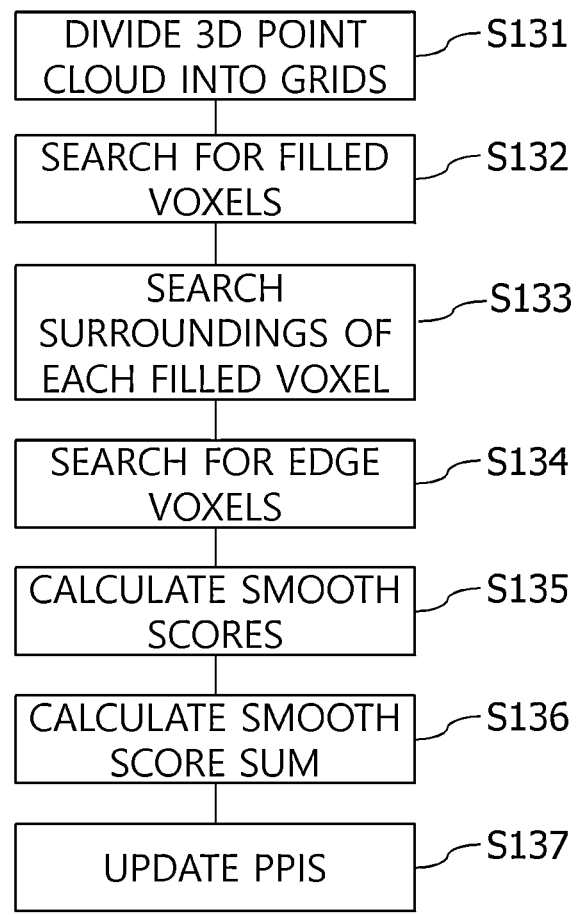
FIG. 6 is a detailed flowchart of operation S130 according to a third refinement technology.

FIG. 6 is a detailed flowchart of operation S130 according to the third refinement technology.

Referring to FIG. 6, a 3D point cloud coordinate space including segments to be refined is divided into grids at regular intervals (S131).

In this case, a grid size may be set differently depending on features of the point cloud. Multiple unit voxels are obtained through the grid division, and each of the unit voxels may or may not include a point constituting the point cloud. For example, voxels may correspond to cubic spaces divided by multiple grids. Such a voxel may or may not include a point.

A voxel including one or more points is referred to as a "filled voxel," and a voxel including no point is referred to as an "empty voxel."

Subsequently, filled voxels are searched for (S132).

In other words, it is found (determined) which voxels are filled voxels among all the voxels. All the voxels other than the found filled voxels correspond to empty voxels. The found filled voxels may be stored as a one-dimensional (1D) array, and an additional bit array for determining filled voxels among all the voxels may also be stored. For example, the bit array may be referred to as "occFlagArray[1D conversion coordinates]," which will be described below.

Subsequently, surrounding filled voxels (nnFilledVoxel) which are within a specific search radius (or the sum of the numbers of points included in surrounding voxels) from each filled voxel are searched for (S133). Also, in operation S133, indirect edge voxel candidates idecVoxel may also be searched for within a certain radius from each filled voxel.

A current filled voxel (filledVoxel) which is the center of a surrounding search is also referred to as a "current voxel," and found filled voxels (nnFilledVoxel) surrounding the current voxel are also referred to as "surrounding voxels (nnFiledVoxel)."

As a method of searching for filled voxels (nnFilledVoxel) surrounding each filled voxel in a 3D space, a k-d tree radius search algorithm, a lookup table-based search algorithm, etc. may be used. In other words, filled voxels within a certain distance from each filled voxel may be searched for as surrounding filled voxels (nnFilledVoxel) using the k-d tree radius search algorithm, the lookup table-based search algorithm, etc.

In general, an algorithm that is most frequently used in searching for surrounding points or voxels in a 3D space is the k-d tree radius search algorithm. However, when a surrounding voxel search process is performed on the basis of the k-d tree radius search algorithm, there are the following two problems: 1) it takes considerable time to create a k-d tree data structure, and 2) the amount of computation and memory access for finding surrounding voxels on the basis of the generated data structure drastically increase with an increase in the number of voxels.

In other words, a surrounding voxel search process on the basis of a k-d tree radius search occupies more than 70% of the total amount of computation for FGRS. Due to the large amount of computation for the surrounding voxel search process based on a k-d tree radius search, the total amount of computation for an FGRS and V-PCC encoding process increases, and the processing speed becomes very slow. Accordingly, it is very difficult to perform V-PCC encoding in real time.

To solve this problem, the lookup table-based search algorithm may be used. In other words, filled voxels within a certain distance from each filled voxel may be searched for as surrounding filled voxels (nnFilledVoxel) using the lookup table-based search algorithm. The lookup table-based search algorithm will be described in detail below.

Subsequently, edge voxels (edgeFilledVoxels) located at segment boundaries are searched for among all the filled voxels (S134).

The edge voxels are filled voxels that are present at the segment (cluster) boundaries or at a certain distance from the segment boundaries and include one or more points. The edge voxels may include direct edge voxels deVoxel and indirect edge voxels ideVoxel. In other words, the direct edge voxels are filled voxels that include at least a part of the segment (cluster) boundaries and one or more points in which at least two points have different PPIs when a plurality of points are included. Also, the indirect edge voxels are filled voxels that are within a certain radius from a direct edge voxel and include one or more points.

A segment is a set (cluster) of points having the same PPI. In other words, segmentation refinement is not performed on all the points. Rather, edge voxels that are present at segment boundaries and surroundings thereof are searched for, and refinement is only performed on points included in the corresponding edge voxels. Accordingly, refinement can be performed at a high speed.

Subsequently, a smooth score scoreSmooth of each of all the filled voxels is calculated (S135). A smooth score is a score used for updating a PPI of each point in all edge voxels.

For example, a smooth score of a filled voxel v may be represented by Expression 1.

$$\text{scoreSmooth}[v][p] \qquad \qquad \text{[Expression 1]}$$

Here, v is an index of the filled voxel, and p is a PPI value within a certain range (e.g., from 0 to 17). In other words, according to Expression 1, the number of points having the PPI value of p in the filled voxel v may be calculated as a smooth score of the filled voxel. Such a smooth score in accordance with Expression 1 may be calculated for all the filled voxels.

In operation S135, smooth scores may be calculated only for the edge voxels and filled voxels (nnFilledVoxel) surrounding the edge voxels, or smooth scores may be calculated only for the filled voxels (nnFilledVoxel) surrounding the edge voxels.

Subsequently, a smooth score sum scoreSmoothSum of each edge voxel is calculated (S136). A smooth score sum of each edge voxel may be calculated using (i.e., by adding) smooth scores (scoreSmooth) of filled voxels surrounding the edge voxel. Accordingly, a smooth score sum scoreSmoothSum of an edge voxel may be interpreted as a smooth score of the edge voxel.

For example, each smooth score sum may be calculated in accordance with Expression 2 below.

$$scoreSmoothSum[v][p] = \frac{\sum_{j=1}^{N}\left(\frac{scoreSmooth[nn\text{ Filled Voxels}[v][j]][p]}{(dist[v][j] + M)}\right)}{\sum_{j=1}^{N}\left(\frac{1}{(dist[v][j] + M)}\right)}$$

[Expression 2]

Here, scoreSmoothSum[v][p] is a smooth score sum of filled voxels that surround an edge voxel v and have a PPI of p. Also, N is the number of filled voxels (nnFilledVoxel) surrounding the edge voxel v, and j is an index of a filled voxel (nnFilledVoxel) surrounding the edge voxel v.

Expression 2 shows a method of calculating a smooth score sum by giving weights to distances between a current edge voxel and filled voxels (nnFilledVoxel) surrounding the edge voxel. In other words, weights inversely proportional to the distances may be given.

Meanwhile, according to the second refinement technology, a smooth score sum is calculated in accordance with Expression 2' below.

$$scoreSmoothSum[v][p] = \sum_{j=1}^{N}scoreSmooth[nn\text{ Filled Voxels}[v][j]][p]$$

[Expression 2']

In other words, according to the second refinement technology, a simple method of equally adding the number of PPIs regardless of the distances from a current voxel to surrounding voxels is used. However, a PPI based on a normal vector of a point naturally has a closer relationship with an adjacent voxel than a distant voxel. Accordingly, according to the second refinement technology, there is a high probability of over-smoothing due to an incorrect PPI update affected by a voxel distant from an initial segment boundary or the like. As a result, the precision of segmentation refinement is degraded, and compressed picture quality is highly likely to be lowered.

On the other hand, according to the third refinement technology, the simple score calculation method of Expression 2' is improved by giving weights which are inversely proportional to the distances between a current edge voxel and voxels surrounding the edge voxel, to the distances in accordance with Expression 2. In this way, a smooth score sum of the current edge voxel is more affected by a smooth score of a voxel at a shorter distance so that the above-described problem can be solved. Accordingly, the third refinement technology allows precise segmentation refinement which reduces over-smoothing, and as a result, it is possible to improve performance, such as a compression rate, picture quality, etc., of V-PCC encoding.

Specifically, in Expression 2, dist[v][j] is the distance between edgeFilledVoxel[v] which is a current edge voxel and nnFilledVoxel[j] which is one of the voxels surrounding the edge voxel. For example, dist[v][j] may be calculated using L2 norm, squared L2 norm, etc.

In Expression 2, N filled voxels (nnFilledVoxel) having a PPI value of p surround the filled voxel v. Here, scoreSmooth[nnFilledVoxels[v][j][p] which is a smooth score of a surrounding filled voxel j is divided by dist[v][j]+M which is a distance item. Such divided values calculated for all the N surrounding filled voxels are added (hereinafter, a "first sum") so that the dividend item $$\sum_{j=1}^{N}\left(\frac{scoreSmooth[nn\text{ Filled Voxels}[v][j]][p]}{(dist[v][j] + M)}\right)$$

of Expression 2 is calculated. In other words, a smooth score sum scoreSmoothSum[v][p] of the current edge voxel v has a value proportional to the first sum. Also, reciprocals of dist[v][j]+M which is the distance item are added (hereinafter, a "second sum") as the divisor item $$\sum_{j=1}^{N}\left(\frac{1}{(dist[v][j] + M)}\right).$$

In other words, the smooth score sum scoreSmoothSum[v][p] of the current edge voxel v has a value inversely proportional to the second sum.

Unlike in the second refinement technology of Expression 2' in which smooth scores of N surrounding filled voxels are added, in Expression 2, the first sum of values obtained by dividing the smooth scores of the surrounding filled voxels by the distance item is divided by the second sum of reciprocals of the distance item. Accordingly, it is possible to reflect weights inversely proportional to the distances between the current edge voxel and the surrounding filled voxels.

In Expression 2, M is a constant for adjusting a weight reflection ratio and may have a value of 2, 4, etc. Unlike in Expression 2, M may be a value multiplied by dist[v][j]. Further, a constant may be multiplied by dist[v][j], and another constant may be added to the product. Such a weight reflection ratio constant has the following two functions.

M has a first function of avoiding a calculation of dividing the first sum or the second sum by zero when dist[v][j] is 0. Also, M has a second function of partially adjusting a distance-based weight which is affected by dist[v][j]. In other words, the distance item obtained by adding M to dist[v][j] works as a weight so that the weight can be adjusted by M which is adjusted by a setting of a user.

Subsequently, a PPI of each individual point in each edge voxel is updated using the calculated smooth score sum (S137). In other words, a PPI of each individual point in a current edge voxel to be refined may be updated on the basis of a final score which is calculated using the calculated smooth score sum.

Specifically, a PPI of each individual point in a current edge voxel may be updated by comparing a best score bestScore and a final score score[i][p] of the current edge voxel with each other. The best score is initially set to 0 and compared with a final score calculated with respect to each individual projection plane of the corresponding point. When the final score value of the projection plane is larger than the existing best score, the final score is set as the best score. This is repeated for all projection planes (e.g., a minimum of 6 to a maximum of 18), and then a PPI of the corresponding point is updated with p which is a projection plane set as the best score.

A final score of points in the current edge voxel is calculated on the basis of the smooth score sum calculated in operation S136. For example, the final score may be calculated by multiplying the smooth score sum by a weight and adding a normal score to the product. In other words, a normal score scoreNormal[v][i][p] for a point index i, a projection index p, and the current edge voxel v may be calculated as the inner product of a normal vector normal[v][i] of an $i^{th}$ point in the current edge voxel v and a projection plane vector orientation[p] for the projection plane index p as shown in Expression 3 below.

$$\text{scoreNormal}[v][i][p]=\text{normal}[v][i]\cdot\text{orientation}[p] \qquad \text{[Expression 3]}$$

Here, the normal vector normal[v][i] is the normal vector of the $i^{th}$ point included in the current edge voxel v, and the projection plane vector orientation[p] is a predefined $p^{th}$ projection plane.

As shown in Expression 4 below, the final score score[v][i][p] may be calculated by adding the normal score scoreNormal[i][p] to a normalized value of the smooth score sum scoreSmoothSum[v][p]. Here, the normalized value may be calculated by multiplying a weight λ by a value obtained by dividing the smooth score sum scoreSmoothSum[v][p] by a value $$\sum_{p=1}^{K} scoreSmoothSum[v][p]$$

obtained by adding K (where K is the number of PPIs ranging from a minimum of 6 to a maximum of 18 in accordance with an encoder setting) smooth score sums scoreSmoothSum[v][p]. In other words, score[v][i][p] is a final score for a $p^{th}$ PPI of the $i^{th}$ point in the current edge voxel v and may be proportional to each of the normalized value of the smooth score sum scoreSmoothSum[v][p] and the normal score scoreNormal[i][p]. For example, the weight λ may be set to 3 as a default value.

$$score[v][i][p] = scoreNormal[v][i][p] + \left( \frac{\lambda}{\sum_{p=1}^{K} scoreSmoothSum[v][p]} \right) \times scoreSmoothSum[v][p] \qquad \text{[Expression 4]}$$

Meanwhile, according to the second refinement technology, a refined second final score score[v][i][p] may be calculated by adding the normal score scoreNormal[i][p] to a value obtained by dividing the product of the smooth score sum scoreSmoothSum[v][p] and the weight λ by the number of points nnNumPoints included in surrounding filled voxels of the current edge voxel as shown in Expression 4' below.

$$score[v][i][p] = scoreNormal[v][i][p] + \frac{\lambda}{nnNumPoints[v]} \times scoreSmoothSum[v][p] \qquad \text{[Expression 4']}$$

Finally, the above-described process of operations S135 to S137 is repeated for points included in all the edge voxels so that the segmentation refinement process is finished.

Lookup Table-Based Operation S133

A process of performing operation S133 using a lookup table-based search algorithm will be described below.

Figure 7:
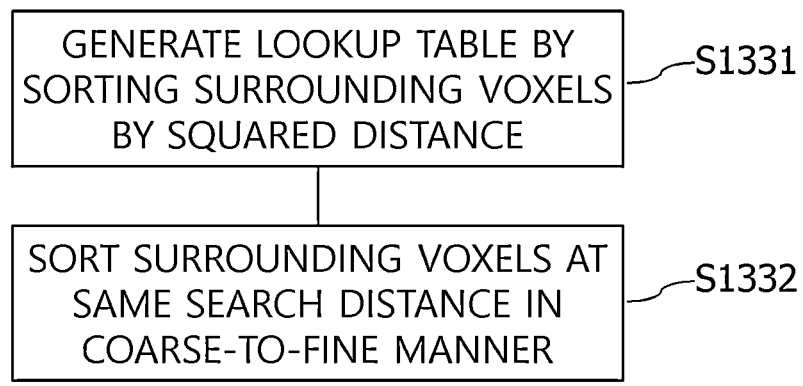
FIG. 7 is a detailed flowchart of operation S133 performed on the basis of a lookup table.

FIG. 7 is a detailed flowchart of operation S133 performed on the basis of a lookup table.

In other words, in operation S133, surrounding voxels nnFilledVoxel which are filled voxels within a specific search radius (or the sum of the numbers of points included in surrounding voxels) from each filled voxel are searched for on the basis of a lookup table. To this end, operation S133 may include operations S1331 and S1332 as shown in FIG. 7.

Figure 8A:
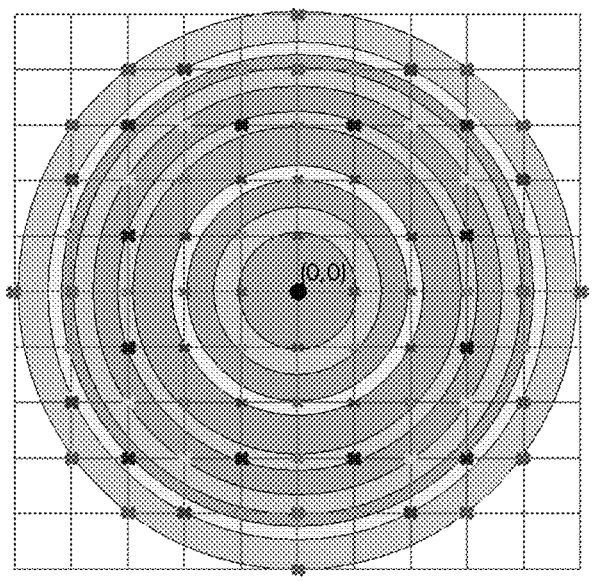
FIGS. 8A and 8B are examples of fixed positions in accordance with distances between a current voxel and surrounding voxels.
Figure 8B:
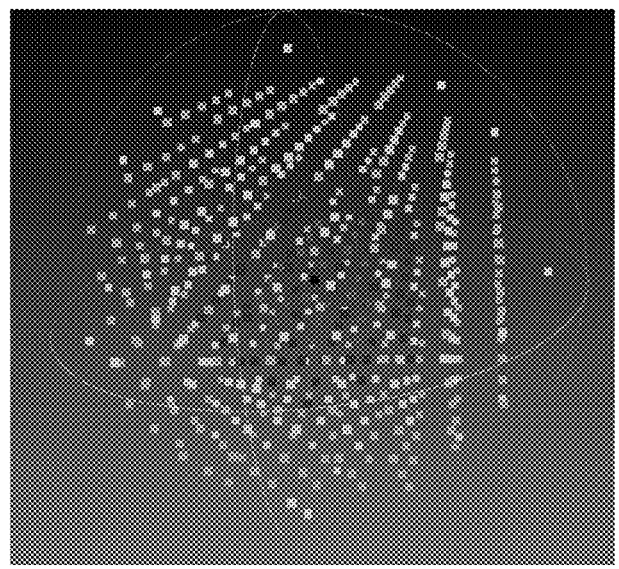

FIGS. 8A and 8B examples of fixed positions in accordance with distances between a current voxel and surrounding voxels. FIG. 8A shows a 2D example, and FIG. 8B shows a 3D example. Each voxel corresponds to one of voxels surrounding a central voxel. In other words, the search radius is a circular shape in two dimensions but is a spherical shape in three dimensions.

First, surrounding voxels close to a current voxel in a 3D space may be defined by a sphere range in accordance with a search distance, and corresponding coordinates (relative coordinates of the surrounding voxels with respect to the current voxel) have already been fixed in accordance with distance. For example, when coordinates of a current voxel are (0, 0) in the 2D example of FIG. 8A, a total of four surrounding voxels are present at a distance d of 1 from the current voxel and have coordinates of (−1, 0), (1, 0), (0, 1), and (0, −1). Also, a total of four surrounding voxels are present at a squared distance $d^2$ of 2 from the current voxel having the coordinates of (0, 0) and have coordinates of (1, 1), (1, −1), (−1, 1), and (−1, −1).

Accordingly, a "lookup table based on the squared distance $d^2$ (dist2)" (see FIG. 9), which is expressible with a small amount of data as long as a maximum search radius is limited, may be generated and stored in the memory 140. In other words, a lookup table is generated by sequentially sorting voxels surrounding a current voxel by squared distance from the current voxel (S1331).

For example, assuming that 3D coordinates of a current voxel are (x, y, z), relative coordinates (dx, dy, dz) of a surrounding voxel in accordance with the distance d may be calculated through the lookup table, and actual coordinates of the surrounding voxel are calculated to be (x+dx, y+dy, z+dz).

(1) Design of Lookup Table for 3D-Geometrically Widely (Without Bias) Using Surrounding Voxel Distribution 1.1) Motivation According to an FGRS algorithm, in the case of searching for surrounding voxels nnFilledVoxel which are filled voxels surrounding a current filled voxel (i.e., a current voxel), a maximum value $N_{MAX}$ of the sum of the numbers of points in the surrounding voxels (i.e., the sum of points included in the surrounding voxels) is defined (set) as a parameter to prevent an excessive increase in the number of points included in the surrounding voxels (i.e., to search for surrounding voxels within a specific search radius or the sum of the numbers of points included in surrounding voxels). For example, the maximum value $N_{MAX}$ may be set to 1024 by default.

However, due to this limitation, only some of the surrounding filled voxels within a corresponding search distance may be included in a final search result as surrounding voxels nnFilledVoxel. For example, when filled voxels within the squared distance $d^2$ of 25 are searched for surrounding voxels nnFilledVoxel, only some filled voxels at the squared distance $d^2$ of 25 (the outermost voxels in FIGS. 8A and 8B) may be included in a final search result as surrounding voxels nnFilledVoxel due to the limitation on the maximum value $N_{MAX}$ of the sum of the numbers of points, which happens frequently.

As a result, in this situation, the other operations of operation S130 are performed using information on only surrounding voxels at biased positions (i.e., clustering on one side in the 3D space), and thus the precision of segmentation refinement, the final goal of FGRS, is degraded. In the above example, only voxels present on the upper side among the voxels at the squared distance $d^2$ of 25 may be used as surrounding voxels.

In other words, when surrounding voxels are searched for on the basis of k-d tree radius search according to the existing FGRS algorithm such as the second refinement technology, voxels present at the same distance (e.g., in the above example, voxels at the squared distance of 25) as a search result are sorted regardless of geometrical 3D positions, which leads to the above-described problem.

1.2) Solution

A lookup table is designed to sort voxels present at the same search distance from a current voxel (i.e., surrounding voxels at the same squared distance from the current voxel) in a 3D space geometrically in a coarse-to-fine manner (S1332).

FIG. 9 is an example of a lookup table generated according to a first exemplary embodiment. In FIG. 9, $d^2$ is a squared distance. In other words, in FIG. 9, when a voxel corresponds to an upper row at which $d^2$ decreases in the column direction (i.e., the search distance shortens and thus the voxel approaches a row at which $d^2=1$), the voxel has a higher priority of sorting (i.e., a fast sorting order), and in a row having the same $d^2$ (i.e., at the same search distance), a voxel corresponding to a more leftward column has a higher priority of sorting.

In summary, in operation S1331, voxels surrounding a current voxel are primarily sorted by the squared distance $d^2$ from the current voxel (i.e., sorted in increasing order of squared distance from the top row to the bottom row in FIG. 9), and in operation S1332, voxels at the same search distance among the primarily sorted voxels (i.e., voxels at the same row in FIG. 9) are sorted in accordance with a first or second exemplary embodiment to be described below. Operations S1331 and S1332 may be simultaneously performed.

First Exemplary Embodiment

Specifically, voxels at the same search distance are sorted in order of the following conditions ①, ②, and ③.
① Voxels on each of the three axes in the coordinate system
② Voxels in each of the three planes in the coordinate system
③ Voxels in eight spaces equally divided by the planes excluding the axes and the planes In other words, coordinates of surrounding voxels having the same search distance on the x-axis, y-axis, and z-axis are first sorted one by one (coarse) under condition ①, coordinates of surrounding voxels having the same search radius in the y-z plane, x-z plane, and x-y plane are next sorted one by one under condition ②, and coordinates of other voxels in the eight spaces are finally sorted one by one (fine) under condition ③.

Also, under each of the conditions, a method of selecting voxels one by one with respect to each axis, plane or space and sequentially sorting the selected voxels (hereinafter, a "first method") or a method of sequentially sorting surrounding voxels in a random order (hereinafter, a "second method") may be performed.

In other words, when the first method is performed on surrounding voxels that satisfy condition ① while having the same squared distance $d^2$, one of surrounding voxels on any one (first axis) of the x-axis, y-axis, and z-axis is first selected and sorted in priority order, one of surrounding voxels on another (second axis) of the x-axis, y-axis, and z-axis is selected and sorted next in priority order, and then one of surrounding voxels on the other (third axis) of the x-axis, y-axis, and z-axis is selected and sorted next in priority order. When surrounding voxels still remain, the above-described method may be continuously performed on the remaining voxels to sequentially sort the voxels, or the second method may be performed.

Meanwhile, when the second method is performed on surrounding voxels that satisfy condition ① while having the same squared distance $d^2$, surrounding voxels on the x-axis, y-axis, and z-axis are sorted by order (priority order).

Also, when the first method is performed on surrounding voxels that satisfy subsequent condition ②, the next condition, while having the same squared distance $d^2$, one of surrounding voxels in any one (first plane) of the y-z plane, x-z plane, and x-y plane is selected and sorted in priority order, one of surrounding voxels in another (second plane) of the y-z plane, x-z plane, and x-y plane is selected and sorted next in priority order, and one of surrounding voxels in the other (third plane) of the y-z plane, x-z plane, and x-y plane is selected and sorted next in priority order. When surrounding voxels still remain, the above-described method may be continuously performed on the remaining voxels to sequentially sort the voxels, or the second method may be performed.

Meanwhile, when the second method is performed on surrounding voxels that satisfy condition ② while having the same squared distance $d^2$, surrounding voxels on the y-z plane, x-z plane, and x-y plane are sorted in random order (priority order).

Further, when the first method is performed on surrounding voxels that satisfy subsequent condition ③, the next condition, while having the same squared distance, one of surrounding voxels in a first space among the eight spaces is selected and sorted in priority order, one of surrounding voxels in a second space among the eight spaces is selected and sorted in priority order, one of surrounding voxels in a third space among the eight spaces is selected and sorted in priority order, and then one of surrounding voxels in a fourth space among the eight spaces is selected and sorted in priority order. In this way, voxels in each of fifth to eighth spaces are sequentially selected one by one and sorted in priority order. When surrounding voxels still remain, the above-described method may be continuously performed on the remaining voxels to sequentially sort the voxels, or the second method may be performed.

Meanwhile, when the second method is performed on surrounding voxels that satisfy condition ③ while having the same squared distance $d^2$, surrounding voxels in the eight spaces are sorted in random order (priority order).

For example, among surrounding voxels having the same search distance radius of $d^2=1$ which is the shortest squared distance from a current voxel, surrounding voxels satisfying condition ① at (1, 0, 0), (0, 1, 0), (0, 0, 1), (−1, 0, 0), (0, −1, 0), and (0, 0, −1), may be sorted in accordance with the first or second method. After that, subsequent conditions ② and ③ are skipped because there is no surrounding voxel satisfying conditions ② and ③.

Subsequently, among surrounding voxels having the same search distance radius of $d^2=2$ which is the second shortest squared distance from the current voxel, no surrounding voxel satisfies condition ①, and thus condition ① may be skipped. Surrounding voxels satisfying condition ②, the next condition, at (0, 1, 1), (1, 0, 1), (1, 1, 0), (0, −1, 1), (−1, 0, 1), and (−1, 1, 0) may be sorted in accordance with the first or second method, and subsequent condition ③, the next condition, is skipped because there is no surrounding voxel satisfying condition ③.

Subsequently, among surrounding voxels having the same search distance radius of $d^2=3$ which is the third shortest squared distance from the current voxel, no surrounding voxel satisfies conditions ① and ②, and thus conditions ① and ② may be skipped, and surrounding voxels satisfying condition ③, the next condition, at (1, 1, 1), (−1, −1, −1), (1, 1, −1), (−1, −1, 1), (−1, 1, −1), (1, −1, 1), (−1, 1, 1), and (1, −1, −1) may be sorted in accordance with the first or second method.

Other surrounding voxels having the same search distance may be sorted in the above-described manner.

Particularly, in the case of surrounding voxels having the same search distance, the squared distance $d^2$ of 9, from the current voxel, surrounding voxels satisfying condition ① at (3, 0, 0), (0, 3, 0), (0, 0, 3), (−3, 0, 0), (0, −3, 0), and (0, 0, −3) may be sorted in accordance with the first or second method. Subsequent condition ②, the next condition, is skipped because there is no surrounding voxel satisfying condition ②, and surrounding voxels satisfying condition ③, the next condition, at (1, 2, 2), (−2, −2, −1), (2, 2, −1), (−2, −1, 2), (−2, 2, −1), (2, −1, 2), (−1, 2, 2), (2, −2, −1), (2, 1, 2), (−2, −1, −2), (1, 2, −2), (−1, −2, 2), (−1, 2, −2), (1, −2, 2), (−2, 1, 2), (2, −1, −2), (2, 2, 1), (−1, −2, −2), (2, 1, −2), (−2, −2, 1), (−2, 1, −2), (2, −2, 1), (−2, 2, 1), and (1, −2, −2) may be sorted in accordance with the first or second method.

Second Exemplary Embodiment 3D vectors are generated from relative coordinates of voxels surrounding an origin at coordinates of a current voxel, and then angles of the generated vectors of the relative coordinates with respect to each of planes based on the three axes (the x-axis, y-axis, and z-axis) are calculated as follows. Subsequently, the voxels surrounding the current voxel are sorted by the calculated angles of the voxel coordinates in a coarse-to-fine manner.

An angle with respect to the y-z plane on the basis of the x-axis (a voxel coordinate angle of the x-axis)
An angle with respect to the x-z plane on the basis of the y-axis (a voxel coordinate angle of the y-axis)
An angle with respect to the x-y plane on the basis of the z-axis (a voxel coordinate angle of the z-axis)

An angle of a 3D vector in a 3D space may be calculated with respect to each plane (y-z, x-z, and x-y) using the inner product of vectors. Accordingly, one 3D vector has one angle corresponding to each plane and thus has three angles in total. The surrounding voxels may be appropriately sorted in the coarse-to-fine manner using these three angles.

For example, the voxels surrounding the current voxel are selected and sorted one by one in accordance with angles based on the x-axis, y-axis, and z-axis (in a first order which is increasing order of angle or a second order which is decreasing order of angle).

Referring to FIG. 9, relative coordinates of candidates in the lookup table are primarily sorted by squared distance $d^2$ (S1331), and relative coordinates at the same squared distance $d^2$ are 3D-geometrically sorted in the coarse-to-fine manner of the first or second exemplary embodiment (S1332). Here, filled voxels may not be distinguished with the lookup table alone. This is because the lookup table only has coordinates and squared distances of voxels. Accordingly, the lookup table may be searched for surrounding voxels, and then it may be determined whether found surrounding voxels are filled voxels with reference to the bit array previously stored in operation S132.

(2) Method of Searching for Surrounding Voxels Based on Lookup Table 2.1) Motivation a) To search the lookup table for surrounding voxels, it is necessary to determine in operation S132 whether filled voxels are present at specific coordinates in the 3D space, and 1D array index information of filled voxels determined to be present and stored in operation S132 is necessary in operation S133. In other words, index information of a 1D filledVoxel array (stored in operation S132) which is a 1D array stored in advance regarding the determined filled voxels is necessary in operation S133.

To this end, it is necessary to ensure a sufficient additional buffer filledVoxelsIndex for a 3D space corresponding to a grid space (gridDimension×gridDimension×gridDimension). Here, gridDimension is a voxel coordinate range obtained by dividing x, y, and z point coordinate ranges of a point cloud by a voxel size (2 or 4). For example, in the case of a 10-bit point cloud, x, y, and z coordinates of a point have a maximum of 1024, and when a voxel size is 2, gridDimension has a value of 512 which is the maximum of the voxel coordinate range. When a filled voxel is present at voxel coordinates of (x, y, z), the index information of the existing 1D filledVoxel array is stored at a position of a 1D conversion coordinate in accordance with Expression 5 (i.e., a coordinate obtained by converting 3D coordinates of filled voxels into one dimension). When the voxel coordinates (x, y, z) correspond to an empty voxel (a voxel including no point), a value (e.g., −1) representing an empty voxel is stored at a position of a corresponding 1D conversion coordinate.

$$\text{1D coord of}(x,y,z) = x + y \times \text{grid Dimension} + z \times \text{grid Dimension}^2 \qquad \text{[Expression 5]}$$

Here, 1D coord of (x, y, z) is a result of converting coordinates (x, y, z) of a voxel into a 1D coordinate.

However, with an increase in gridDimension, a required amount of memory drastically increases. For example, in the case of gridDimension=512 (when the maximum of the point (x, y, z) is 1024 and voxelDimension equals 2), a required additional buffer has a memory size of 512×512×512×size of (uint32_t)=512 Mbyte. In the case of gridDimension=2048, 2 Gbyte memory is required. Accordingly, a lookup table-based search method for reducing excessive memory use is necessary.

b) Meanwhile, when a filledVoxelsIndex array which is an array of pieces of index information of a 1D filledVoxel array is expressed not as a simple 1D array but as a map data structure including multiple elements which include (key, value) pairs as one element, the corresponding data size can be remarkably reduced. In other words, since only index information of filled voxels is stored in a map, it is unnecessary to indicate empty voxels, and memory use is very low accordingly. In general, the number of filled voxels is much smaller than the number of empty voxels, and the amount of data corresponding to empty voxels can be reduced.

Specifically, in the map data structure, "key" is a 1D conversion coordinate (i.e., the result of Expression 5) of a filled voxel, and "value" is the index information of the existing 1D filledVoxel array. However, in a map, a value matching a key value is generally searched for. Accordingly, despite low memory use, a map shows a very low value access (search) speed compared to a general 1D array access speed. In other words, when a search target has no key value in such a map search, the search target corresponds to an empty voxel, which occupies a large amount of data compared to a filled voxel. As a result, many searches for the empty voxel require a large amount of computation.

Therefore, a new method is necessary to increase a lookup table-based surrounding voxel search speed in such a map data structure while reducing memory use.

2.2) Solution

According to the present disclosure, in operation S132, filled voxels are searched for, and the search results are stored using a method that only combines the advantages of method a) and method b).

In other words, in operation S132, an "empty voxel display" function is separated and stored in a bit (0 or 1) array occFlagArray[1D conversion coordinate] (i.e., each element of the bit array has a size of one bit to only represent whether a voxel of a corresponding 1D conversion coordinate is an empty voxel), and index information of an existing 1D filledVoxel array is stored using a map.

For example, when a voxel of coordinates (x, y, z) is valid (i.e., a filled voxel), occFlagArray[1D conversion coordinate] may be stored and displayed as 1, and when the voxel is not valid (i.e., an empty voxel), occFlagArray[1D conversion coordinate] may be stored and displayed as 0.

Accordingly, in the case of searching for voxels within a specific search radius from each filled voxel on the basis of the above-described lookup table in operation S133, 3D coordinate values of a target voxel are converted into a 1D conversion coordinate in accordance with Expression 5, and a bit array occFlagArray of the 1D conversion coordinate is directly accessed to determine whether the target voxel is an empty voxel. When it is determined that the target voxel is an empty voxel, the target voxel is skipped, and when it is determined that the target voxel is a filled voxel, a corresponding index of a 1D array in which the filled voxel is stored may be calculated using the map.

In this case, a map value access (search) which requires a high cost of search computation is not used for empty voxels having a larger number than filled voxels, and thus the search speed can be increased. For example, a memory size of a bit array calculated in accordance with the example of a) in 2.1) is 512×512×512×1 bit=16 Mbyte.

FIG. 10 is an example of pseudocode for generating a bit array and searching for surrounding voxels using a lookup table.

In FIG. 10, ADJ_List corresponds to nnFilledVoxels, and IDEV_List corresponds to idecVoxels. In other words, in FIG. 10, a sparse symmetric cross array (SSCA) corresponds to a "lookup table in which voxels at the same search distance are 3D-geometrically sorted in the coarse-to-fine manner" generated in advance in accordance with operations S1331 and S1332 of the present disclosure. idecVoxels corresponds to a list of indirect edge voxels surrounding an edge voxel which is used by the FGRS algorithm.

According to the above-described present disclosure, it is possible to precisely and highly efficiently perform FGRS which heavily influences a compression rate and picture quality of V-PCC encoding. In other words, the present disclosure improves an existing simple score calculation method for PPI updates in FGRS for V-PCC encoding into a precise score calculation method in which weights are given to voxel distances. Accordingly, scores for PPI updates are calculated with weights which are inversely proportional to voxel distances. For this reason, precise segmentation refinement for reducing over-smoothing is possible, and as a result, it is possible to improve performance, such as a compression rate, picture quality, etc., of V-PCC encoding.

Also, according to the present disclosure, it is possible to perform FGRS with low complexity at a high speed by performing a surrounding voxel search process, which is necessarily performed in FGRS for V-PCC encoding, on the basis of a lookup table in which a wide range of three-dimensionally surrounding voxel information is used rather than on the basis of a k-d tree radius search. Accordingly, FGRS can be performed by a low amount of computation with low complexity at a high speed. Further, according to the present disclosure, it is possible to increase an encoding rate in V-PCC encoding. In other words, according to the present disclosure, it is possible to increase module execution speed by an average of 50% and slightly improve the overall performance (a compression rate and picture quality) of a V-PCC encoder compared to existing FGRS in which a k-d tree radius search is performed. This is not only because execution speed increases due to a lookup table-based search instead of a k-d tree radius search but also because the overall performance of V-PCC encoding is improved with an improvement in segmentation refinement efficiency through a lookup table design-based search for finding a 3D-geometrically wide range of (unbiased) surrounding voxels.

Effects obtainable from by the present disclosure are not limited to those described above, and other effects which have not been described will be clearly understood by those of ordinary skill in the art from the above description.

Although specific exemplary embodiments have been described in the detailed description of the present disclosure, various modifications are possible without departing from the scope of the present disclosure. Therefore, the scope of the present disclosure is not limited to the described exemplary embodiments and should be defined by the following claims and equivalents thereto.

What is claimed is:

1. A method of performing fast grid-based refining segmentation (FGRS) for video-based point cloud compression (V-PCC) in an electronic device, the method comprising:
   dividing a space of a three-dimensional (3D) point cloud into multiple grids to derive multiple voxels;
   searching for filled voxels which are voxels including one or more points;
   searching for surrounding voxels which are filled voxels within a certain radius from each of the filled voxels;
   searching for edge voxels which are present at a segment edge among all the filled voxels;
   calculating smooth scores for surrounding voxels of each edge voxel and calculating a smooth score sum which is a smooth score for the edge voxel on the basis of the smooth scores of the surrounding voxels of the edge voxel; and
   updating a projection plane index (PPI) for each individual point in the edge voxel using the calculated smooth score sum, wherein the calculating of the smooth score sum comprises giving weights to distances between the edge voxel and the surrounding voxels to calculate the smooth score sum.

2. The method of claim 1, wherein calculating the smooth score sum comprises reflecting the weights inversely proportional to the distances while adding the smooth scores of the surrounding voxels of the edge voxel.

3. The method of claim 1, wherein calculating the smooth score sum comprises reflecting the weights so that the smooth score sum of the edge voxel is more affected by a smooth score value of a surrounding voxel which is closer to the edge voxel.

4. The method of claim 1, wherein calculating the smooth score sum comprises calculating the smooth score sum of the edge voxel which is proportional to a first sum of values obtained by dividing the smooth scores of the surrounding voxels of the edge voxel by a distance item including a corresponding distance.

5. The method of claim 4, wherein calculating the smooth score sum comprises calculating the smooth score sum of the edge voxel which is inversely proportional to a second sum of reciprocals of the distance item for the surrounding voxels of the edge voxel.

6. The method of claim 5, wherein the distance item includes a constant added to the distances.

7. The method of claim 1, wherein updating the PPI comprises calculating a final score for the edge voxel on the basis of the smooth score sum and updating the PPI in accordance with the final score,
wherein the final score is proportional to a value obtained by normalizing the smooth score sum (scoreSmoothSum[v][p]).

8. A device of performing fast grid-based refining segmentation (FGRS) for video-based point cloud compression (V-PCC), the device comprising:
a memory configured to store point clouds; and
a controller configured to control fast grid-based refining segmentation (FGRS) for video-based point cloud compression (V-PCC) encoding using information stored in the memory, of the controller further configured to:
divide a space of a three-dimensional (3D) point cloud into multiple grids to derive multiple voxels;
search for filled voxels which are voxels including one or more points;
search for surrounding voxels which are filled voxels including one or more points within a certain radius from each of the filled voxels;
search for edge voxels which are present at a segment edge among all the filled voxels;
calculate smooth scores for surrounding voxels of each edge voxel and calculating a smooth score sum which is a smooth score for the edge voxel on the basis of the smooth scores of the surrounding voxels of the edge voxel; and
update a projection plane index (PPI) for each individual point in the edge voxel using the calculated smooth score sum,
wherein, to calculate the smooth score sum, the controller is configured to give weights to distances between the edge voxel and the surrounding voxels to calculate the smooth score sum.

9. The device of claim 8, wherein the controller is configured to reflect the weights inversely proportional to the distances while adding the smooth scores of the surrounding voxels of the edge voxel.

10. The device of claim 7, wherein the smooth score sum of the edge voxel is more affected by a smooth score value of a surrounding voxel which is closer to the edge voxel.

11. The device of claim 8, wherein the smooth score sum of the edge voxel is proportional to a first sum of values obtained by dividing the smooth scores of the surrounding voxels of the edge voxel by a distance item including a corresponding distance.

12. The device of claim 11, wherein the smooth score sum of the edge voxel is inversely proportional to a second sum of reciprocals of the distance item for the surrounding voxels of the edge voxel.

13. The device of claim 12, wherein the distance item includes a constant added to the distances.

14. The device of claim 8, wherein, during updating the PPI, the controller is configured to calculate a final score for the edge voxel on the basis of the smooth score sum and updates the PPI in accordance with the final score,
wherein the final score is proportional to a value obtained by normalizing the smooth score sum (scoreSmoothSum[v][p]).

* * * * *